(12) United States Patent
Goldberg et al.

(10) Patent No.: US 10,359,948 B2
(45) Date of Patent: Jul. 23, 2019

(54) I/O PERFORMANCE IN HETEROGENEOUS STORAGE ENVIRONMENTS

(71) Applicant: INTERNATIONAL BUSINESS MACHINES CORPORATION, Armonk, NY (US)

(72) Inventors: Itzhack Goldberg, Hadera (IL); Kai Jehnen, Nieder-Olm (DE); Frank Krick, Ockenheim (DE); Thorsten Muehge, Budenheim (DE); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/687,580

(22) Filed: Aug. 28, 2017

(65) Prior Publication Data
US 2019/0065073 A1 Feb. 28, 2019

(51) Int. Cl.
*G06F 12/00* (2006.01)
*G06F 3/06* (2006.01)

(52) U.S. Cl.
CPC ............ *G06F 3/0613* (2013.01); *G06F 3/065* (2013.01); *G06F 3/0653* (2013.01); *G06F 3/0685* (2013.01)

(58) Field of Classification Search
CPC .... G06F 3/061; G06F 3/0659; G06F 12/0246; G06F 3/067; G06F 3/0685; G06F 3/0689; G06F 3/0653
See application file for complete search history.

(56) References Cited

U.S. PATENT DOCUMENTS 6,802,021 B1 * 10/2004 Cheng ................. G06F 11/0727
710/316
8,219,719 B1 7/2012 Parry et al.
(Continued)

FOREIGN PATENT DOCUMENTS

EP 2765501 A1 8/2014

OTHER PUBLICATIONS

Kennedy, "SAS/SATA Cables Guide—SFF-8087, 8088, 8470, 8482, 8484, and single device connectors", Jan. 31, 2011, Printed on Aug. 22, 2017, pp. 1-5, http://www.servethehome.com/sas-sata-cables-guide-sff8087-8088-8470-8482-8484-single-device-connectors.
(Continued)

*Primary Examiner* — Arvind Talukdar
(74) *Attorney, Agent, or Firm* — Anthony M. Pallone

(57) ABSTRACT

An embodiment of the invention may include a method, computer program product, and system for improving I/O performance in a heterogeneous storage environment. The embodiment may include storage devices of different storage device types having different I/O performances. Each of the storage devices is accessible via a SAS interface. The embodiment may include identifying a plurality of storage devices of the heterogeneous storage environment. The embodiment may include creating a table including information about identifiable storage devices and attributes. The embodiment may include separating a block I/O data stream into storage device type classes. The embodiment may include routing I/O requests of corresponding device type classes to their assigned physical lanes using the information included in the table, thereby improving the I/O performance of the heterogeneous storage environment.

20 Claims, 6 Drawing Sheets

(56) References Cited

U.S. PATENT DOCUMENTS

| | | | | |
|---|---|---|---|---|
| 8,935,493 | B1* | 1/2015 | Dolan | G06F 3/0649 |
| | | | | 711/117 |
| 9,268,501 | B1 | 2/2016 | Isakovich | |
| 2003/0200477 | A1* | 10/2003 | Ayres | G06F 13/102 |
| | | | | 714/2 |
| 2007/0093124 | A1 | 4/2007 | Varney et al. | |
| 2008/0104264 | A1 | 5/2008 | Duerk et al. | |
| 2010/0125857 | A1* | 5/2010 | Dommeti | G06F 3/0604 |
| | | | | 719/326 |
| 2014/0137128 | A1* | 5/2014 | Chang | G06F 9/4881 |
| | | | | 718/103 |
| 2016/0246746 | A1 | 8/2016 | Tan et al. | |
| 2016/0274821 | A1* | 9/2016 | Park | G06F 13/102 |
| 2017/0153814 | A1* | 6/2017 | Ryu | G06F 3/061 |

OTHER PUBLICATIONS

IBM, "IBM Storwize family storage systems with SAS workloads on IBM Power Systems servers", IBM Systems and Techology Group ISV Enablement, Mar. 2013, 48 Pages, SAS deployment on IBM Power servers with IBM Storwize family, Copyright IBM Corporation, 2013.

Diodes Incorporated, "SATA/SAS", Printed on Aug. 21, 2017, 2 Pages, http://www.diodes.com/protocols/sata-sas/.

Trent, "PMC-Sierra's SAS Product Family is in Production and Shipping!", SCSI Trade Association, Printed on Aug. 22, 2017, 6 Pages, http://www.scsita.org/serial-storage-wire/2007/01/pmc-sierras-sas-product-family-is-in-production-and-shipping.html.

HP, "Serial Attached SCSI Technologies and Architecture", Copyright 2010, 21 Pages, Hewlett-Packard Development Company, L.P., Technology Brief, 4th Edition.

LSI, "12 Gb/s SAS: Busting Through the Storage Performance Bottlenecks" Facebook, 2012, 5 Pages, Facebook Engineering Notes, https://www.facebook.com/notes/facebook-engineering/under-the-hood-scheduling-mapreduce-jobs-more-efficiently-with-corona/10151142560538920.

Elliot, "05-381r1 SAS-2 Multiplexing", Dec. 23, 2005, 54 Pages, SAS-Controller Insight, Firmware Blockdiagram, HP, Printed on Aug. 22, 2017, http://www.t10.org/ftp/t10/document.05/05-381r1.pdf.

Elliot, "Serial Attached SCSI Technical Overview", Apr. 2002, 114 Pages, document 2, http://www.t10.org/ftp/t10/document.02/02-158r1.pdf.

Storage News, "IBM Storwize V7000 Gen2", Printed on Aug. 22, 2017, 19 Pages, Storage News, Information Technologies Portal, Copyright 2017 Storage News, http://www.storenews.com/?p=243.

Smith, "Mixing it Up with SAS, SATA", Printed on Aug. 22, 2017, 5 Pages, SCSI Trade Association, LSI Corporation, http://www.scsita.org/serial-storage-wire/2007/07/mixing-it-up-with-sas-sata.html.

Gupta, "SAS Overview", 31 Pages, Copyright 2007 Storage Networking Industry Association, SNIA Education Committee, http://www.snia.org/sites/default/education/tutorials/2007/spring/networking/SAS-overview.pdf.

* cited by examiner

500

| LUN | UID | Type | Other |
|---|---|---|---|
| 21 | 3600A0160196 | flash | ........ |
| 29 | 360060160f83 | HDD_1 | ........ |
| 43 | 760060160f891 | HDD_2 | ........ |
| 15 | 3600F0160f97 | flash | ........ |
| 11 | 1600A2160f99 | HDD_1 | ........ |
| ........ | ........ | ........ | ........ |

FIG. 5

I/O PERFORMANCE IN HETEROGENEOUS STORAGE ENVIRONMENTS

BACKGROUND

The invention relates generally to a method for improving I/O performance of storage systems, and more specifically, to a method for improving the I/O performance in a heterogeneous storage environment. The invention relates further to a related system, in particular a storage system and a computer program product.

BRIEF SUMMARY

According to one aspect of the present invention, a method for improving I/O (input/output) performance in a heterogeneous storage environment may be provided. The heterogeneous storage environment may include storage devices of different storage device types having different I/O performance values. Each of the storage devices may be accessible via a SAS interface. The method may include identifying a plurality of storage devices of the heterogeneous storage environment, creating a table including information about identifiable storage devices, their storage device type and their assigned physical lane, separating a block I/O data stream into storage device type classes, and routing I/O requests of corresponding device type classes to their assigned physical lanes using the information included in the table. Thereby, the I/O performance of the heterogeneous storage environment is improved.

According to another aspect of the present invention, a related system for improving I/O performance in a heterogeneous storage environment may be provided. The heterogeneous storage environment may include storage devices of different storage device types having different I/O performances. Each of the storage devices is accessible via a SAS interface.

BRIEF DESCRIPTION OF THE DRAWINGS

It should be noted that embodiments of the invention are described with reference to different subject-matters. In particular, some embodiments are described with reference to method type claims, whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered to be disclosed within this document.

The aspects defined above and further aspects of the present invention, are apparent from the examples of embodiments to be described hereinafter and are explained with reference to the examples of embodiments, but to which the invention is not limited.

Figure 1:
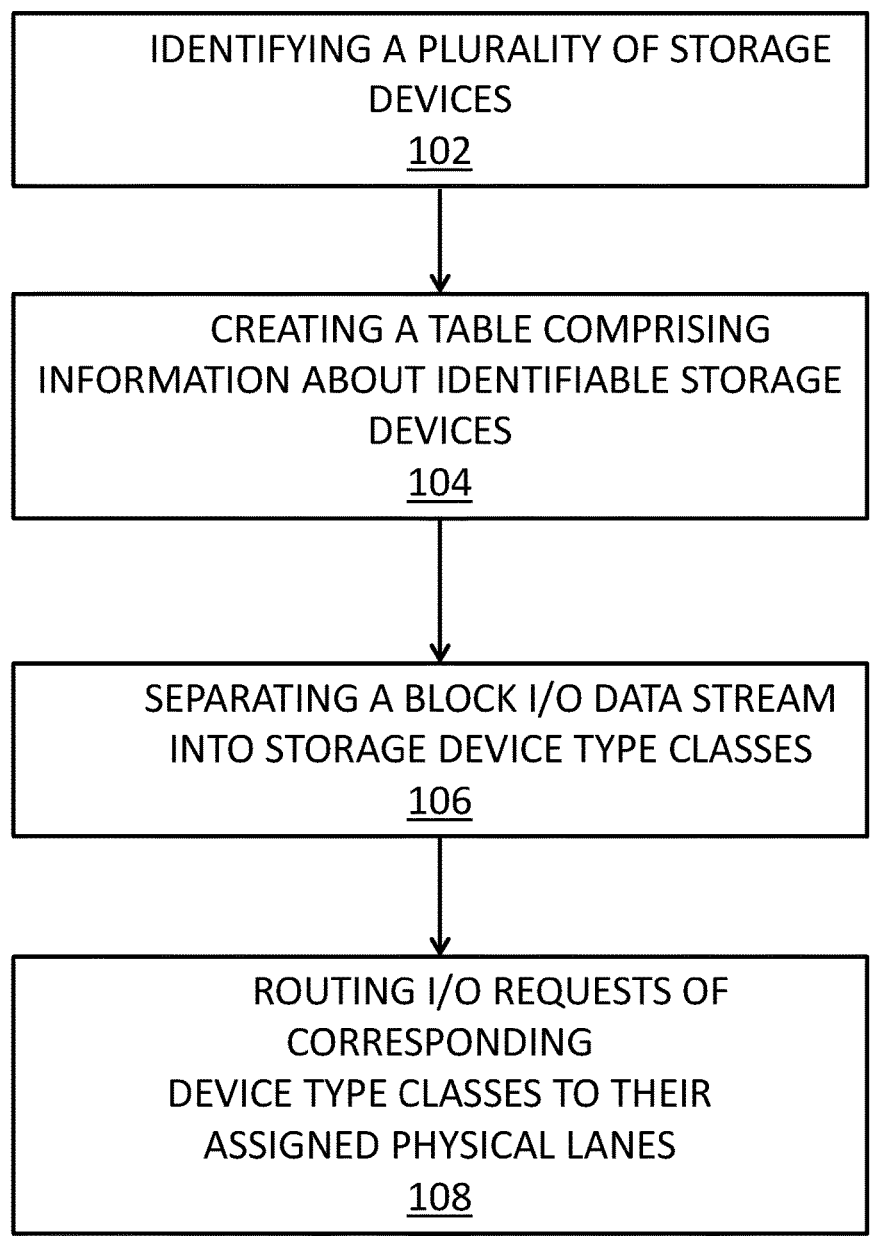
Figure 2:
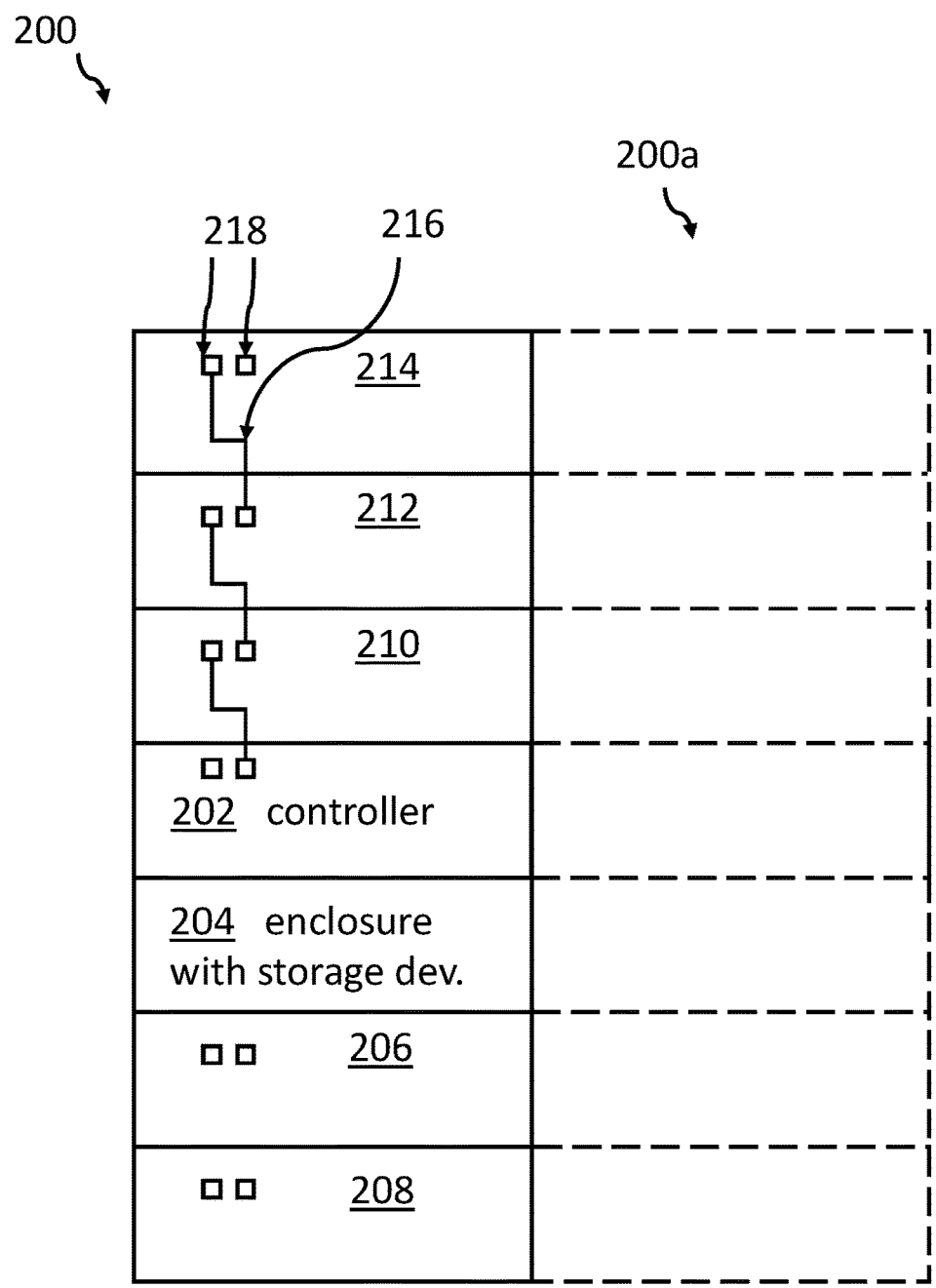
Figure 3:
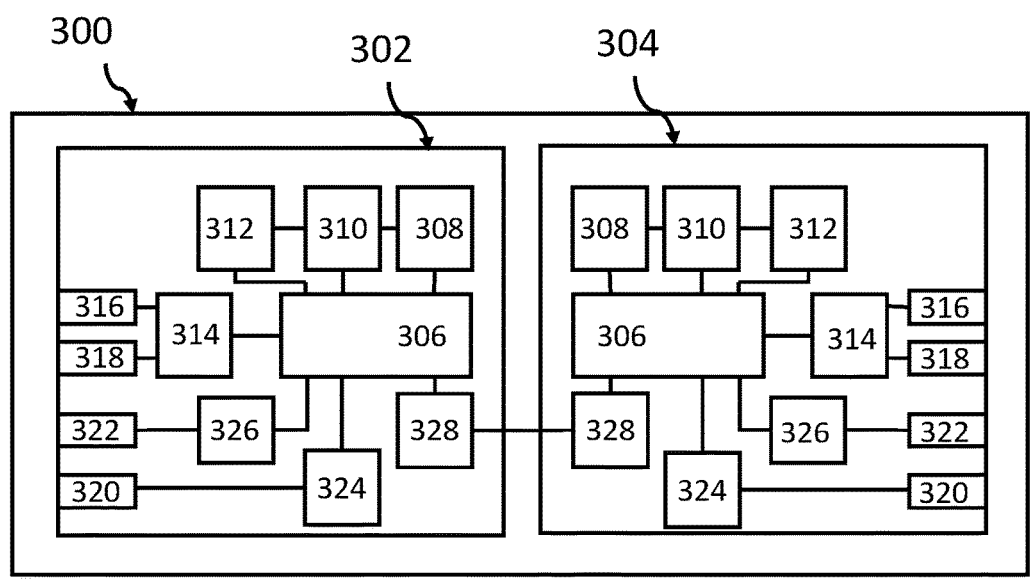
Figure 4:
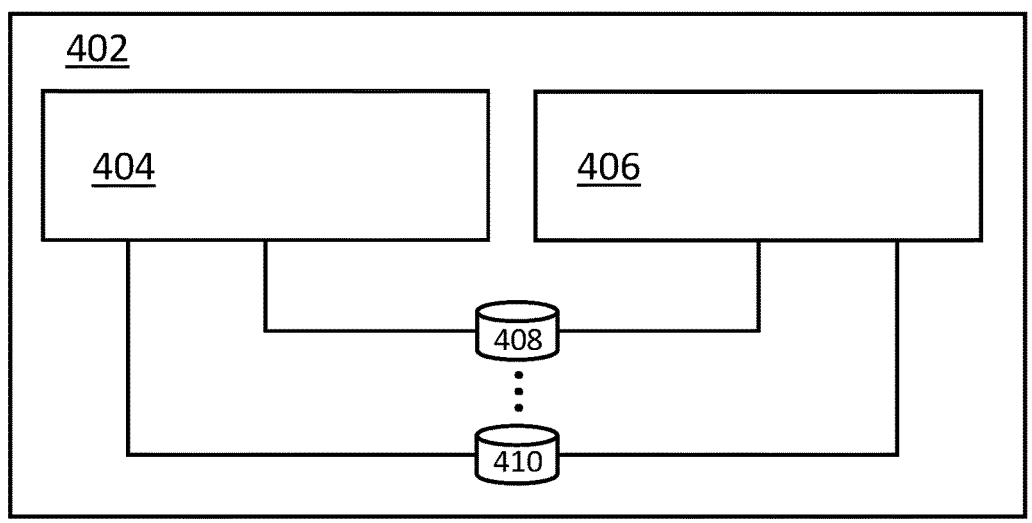
Figure 6:
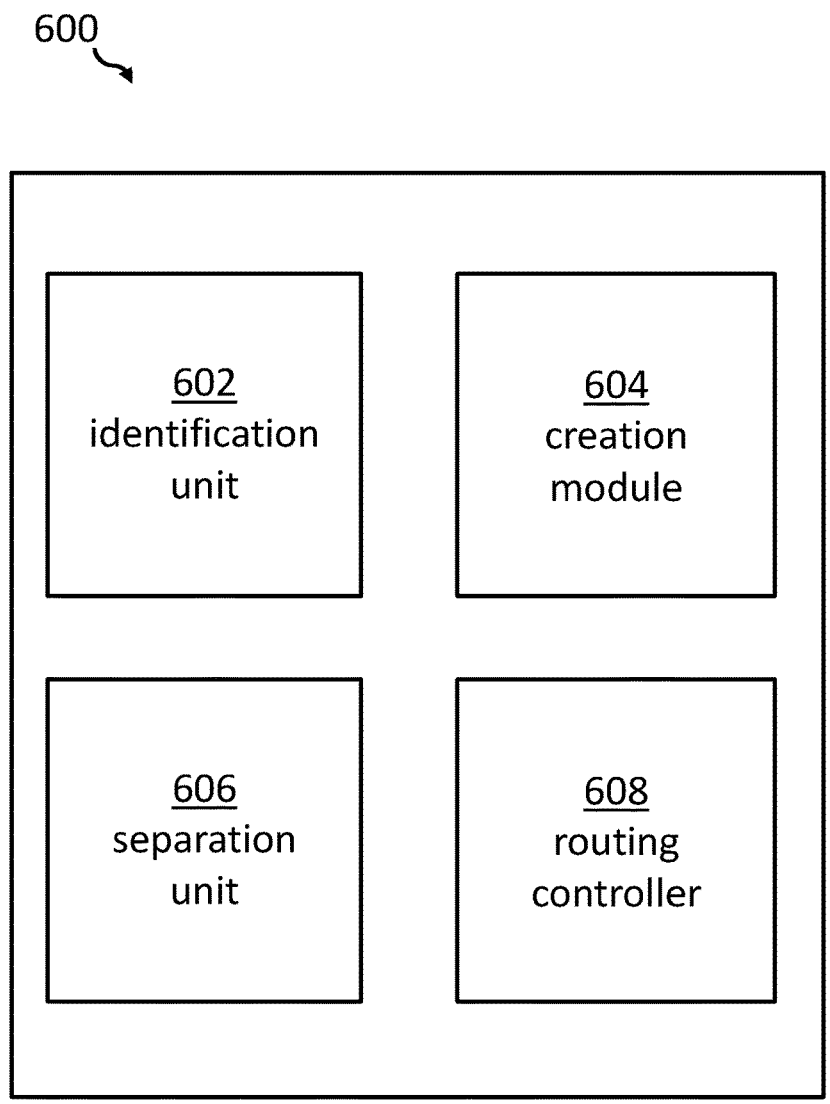
Figure 7:
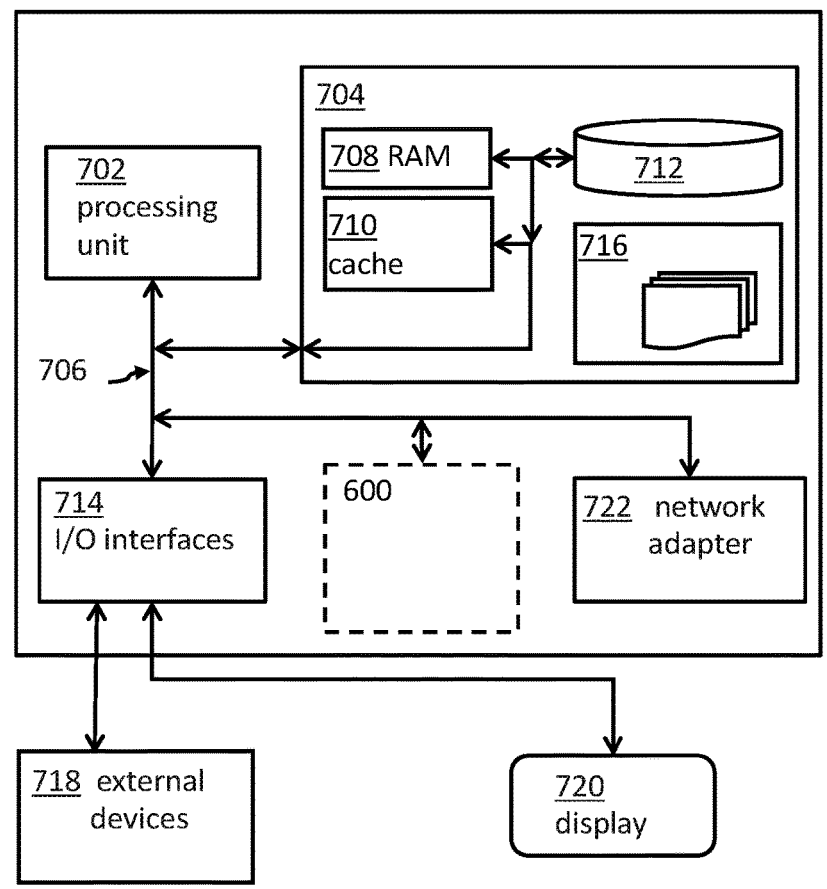

Preferred embodiments of the invention will be described, by way of example only, and with reference to the following drawings:

FIG. 1 shows a flow chart of an embodiment of the inventive method for improving I/O performance in a heterogeneous storage environment;

FIG. 2 shows a block diagram of an embodiment of a storage rack;

FIG. 3 shows a block diagram of an embodiment of a storage controller with enclosures for storage devices in a rack system;

FIG. 4 shows a block diagram of an embodiment of elements of a storage enclosure cabinet;

FIG. 5 shows an exemplary layout of the table including data aboard the storage devices;

FIG. 6 shows an embodiment of the system for improving I/O performance in a heterogeneous storage environment; and FIG. 7 shows an embodiment of a computing system including the system for improving I/O performance in a heterogeneous storage environment.

DETAILED DESCRIPTION

In times of "big data", enterprise data increase continuously so they need to be stored in a controlled and secure way and, in many cases, need to be archived. For this, computer servers are typically connected to storage systems. Often, the storage systems are connected to the servers via a network, e.g., network attached storage (NAS) system. The storage systems typically include a storage controller and a plurality of storage devices organized in a plurality of arrays of storage devices. In the past, only hard drives with spinning magnetic disks have been used in such storage systems. However, over time, also solid state storage devices have been developed, like SSDs (solid state drive) or flash memory drives. Often times, these devices may have the same communication interface as the traditional hard drives. Common communication interfaces for storage systems include SCSI (small computer system interface), which is a set of American National Standards Institute standard electronic interface specification allowing a computer server to communicate with a plurality of different peripheral hardware systems, including storage devices.

Originally, the SCSI interface was a parallel interface, which, over time, developed into the Serial Attached SCSI (SAS) interface which can be seen as today's norm for use in storage systems. Additionally, another technique, namely Serial Advanced Technology Attachment (SATA) may be used to communicate between a computer server and storage devices.

Typical storage systems include a plurality of storage devices which may be controlled by a storage controller. The storage controller may be the primary interface to the network and for the communication with the computer server.

Because of the increased usage of SSDs and their exchangeability against traditional hard drive storage devices, they may also be used as a replacement for the slower hard drive devices. Thus, heterogeneous storage environments including hard drive devices mixed with SSDs have become a typical use case.

In the context of this description, the following conventions, terms and/or expressions may be used:

The term 'I/O performance' may denote the data transfer speed between a storage device like a hard drive device or an SSD and a respective storage controller. Because SSDs are much faster as compared to hard drive devices, storage controllers may have a hard time to optimize the overall performance of a heterogeneous storage environment.

The term 'heterogeneous storage environment' may denote a storage sub-system including a plurality of storage devices of different I/O performance characteristics. The heterogeneous storage environment may include a storage controller and a plurality of storage enclosure cabinets housing the storage devices in arrays. Each of the storage enclosure cabinets may also include a local device controller.

The term 'storage devices' may denote a device capable of storing data of a computing system. Typically, a storage device may be a hardware peripheral device attached to the computing system. Typical storage devices may include hard drive devices and solid state drive devices of various types. The storage devices may be housed within a storage controller chassis or in expansion units, also denoted as storage enclosure cabinet, connected to a storage controller.

The term 'storage device type' may refer to a classification of storage devices, mainly characterizing its I/O performance. However, also other attributes may be used to differentiate storage device types, like the size of the storage device, the used storage technology, the longevity of data in the storage device, and many others.

The term 'SAS interface' may denote the abbreviation for Serial Attached SCSI (small computer system interface).

The term 'block I/O data stream' may denote a stream of data between a storage controller and a storage device. Typically, storage devices store data in blocks of fixed length. Typical block sizes may be 2 kB or 4 kB. However, the proposed method and system is each transparent for the block size. The block I/O data stream may be used for both directions: controller to storage device and storage device to controller.

The term 'assigned physical lane' may denote a physical electrical connection between a storage controller and a storage device. Storage devices may typically be connected to the storage controller in a daisy chain manner. The used physical (Phy) SAS links include a set of 4 wires used as two differential pairs, one pair for transmission (TX) and one pair for a signal reception (RX). A pair of 1 TX and 1 RX is called a lane.

The term 'magnetic hard drive' (aka HDD) may denote a storage device using at least one rotating (or spinning) magnetic disk to which data may be written using a read/write head. The same read/write head may be used to read the data from the magnetic hard drive.

The term 'solid state disk', abbreviated by SSD, may denote a storage device without moving mechanical parts, in particular a spinning magnetic disk. These SSDs typically use semiconductor devices for storing the data. Their I/O performance may be much higher than those of spending magnetic disks—e.g., several 10 times faster. Therefore, and because of falling prices for these types of devices, SSDs may often be used as replacements for classical hard drive storage devices.

The term 'memristor storage' may denote a storage device based on the technology of a non-linear passive two-terminated electric component relating electric charge and magnetic flux linkage. Such devices may today be implemented in CMOS technology. Each cell of such a memristor may store more than two—in particular "0" and "1"—states by increasing or decreasing a resistor value. Another advantage of memristors is that they continue to maintain their statuses without requiring electrical power. Thus, memristors may be used to build non-volatile random-access memory systems.

The term 'magneto-resistive RAM'—or MRAM—may denote a storage device using my meta-resistive technology. Unlike conventional RAM (random access memory) chip technologies, data in MRAM is not stored as electric charge or current flows, but by magnetic storage elements. The elements may be formed from two ferromagnetic plates, each of which may hold a magnetization, separated by a thin insulating layer. One of the two plates may be a permanent magnet set to a particular polarity; the other plate's magnetization may be changed to match that of an external field to store memory. This configuration is known as a magnetic tunnel junction and is the simplest structure for an MRAM bit storage. A complete storage device may be built from a grid of such "cells".

The term 'race track memory'—also domain-wall memory (DWM)—may denote a memory technology also being able to store more than one bit in a single memory cell. Currently, this technology is still under development and not yet in commercial use. However, in early 2008, a 3-bit version was successfully demonstrated. If it would become available commercially, racetrack would offer storage density higher than comparable solid-state memory devices like flash memory and similar, also having a higher read/write performance.

The term 'negotiated link rate' may denote a used data transfer rate between a storage controller and a storage device. The negotiated link rate may vary from storage device class to storage device class.

The term 'SAS target negotiated hardware maximum link rate' may denote a maximum possible communication and data transfer rate between a storage controller and a SAS storage device. This maximum link rate may be dependent on the storage device class.

The term 'SSD device type' may denote storage device using SSD technology. In contrast, the term 'HDD device type' may denote a storage device using hard drive technology.

The proposed method for improving I/O performance in a heterogeneous storage environment may offer multiple advantages and technical effects:

The overall performance of heterogeneous storage environments—i.e., storage systems including a plurality of storage devices of different storage classes—may be optimized and increased. This way, the average access times to data in the heterogeneous storage environment may be increased such that the overall performance of a computer server accessing data (read/write) in the heterogeneous storage environment may also be increased.

Heterogeneous storage environments, which may develop over time in a way in which magnetic hard drives may be replaced by SSD storage devices, may adapt themselves to new mixes of hard drives and SSDs. The storage controller may reconfigure the grouping of storage devices in order to address hard drive storage devices as one group and SSD storage devices as another group. However, there may also be mixed groups of hard drive devices and SSD devices. Depending on threshold values, the storage controller may be enabled to assign the different devices dynamically to a different group in order to increase the overall I/O performance.

The method may enable the related system to perform self-learning procedures in order to adapt its behavior over time by monitoring performance variations in groups of storage devices based on the mixture of hard drive systems compared to SSD devices and/or HDD.

Furthermore, the disadvantages of the traditional method for managing access to storage devices in heterogeneous storage environments may be overcome. Namely, the fact that typically storage devices closer to the storage controller can be accessed faster than those storage devices being further out in the storage rack. By way of dynamic reconfiguration and re-assignments of storage devices of different classes, the access speed—i.e., the I/O performance—to the storage devices may become independent of the position in the daisy-chained storage device enclosures. Users may add SSDs to the storage systems dynamically and/or replacing HDDs against SSDs (or other faster storage devices) without shutting down the heterogeneous storage environment—i.e., the respective storage controller—and/or repositioning storage devices in the enclosures—i.e., the rack—and re-configuring the controller.

In the following, additional embodiments of the proposed method and the related system will be described:

According to one preferred embodiment of the method, each of the storage device types may be selected out of the group including a magnetic hard drive, a solid state disk, a flash memory, a memristor storage, a magneto-resistive RAM and a race track memory. Additionally, in other embodiments, an extended list of storage devices may be supported, for example, a tape drive, a DVD system, and/or other optical or magnetic device types. Hence, basically there is no limit regarding the device types that may be supported by the proposed method and system. By setting the parameters according to the used device types, more or less any mixture of device types in the heterogeneous storage environment may be supported.

According to one permissive embodiment of the method, the table may include additionally at least one attribute for each of the identified storage devices. These attributes may be selected out of the group enclosure ID (ID=identifier value), slot ID, vendor name, SAS initiator port Type, SAS initiator port ID, SAS initiator physical lane ID, SAS enclosure target port ID, SAS enclosure target physical lane ID, SAS target expander port ID, SAS target expander lane ID, SAS target device port ID, SAS target device lane ID, SAS target device negotiated link rate, SAS target device hardware minimum link rate, SAS target device hardware maximum link rate, SAS target negotiated hardware maximum link rate deviation, and a device type. More and other attributes and their related values may be possible. Hence, all parameters that are known or may be requested from the device may be used as attributes in the table. It may be noted that not all devices types may deliver all attribute values upon request. In such cases, the respective field may be empty in the table.

According to one advantageous embodiment, the method, in particular the routing, may include additionally analyzing data blocks stored in an I/O buffer memory—in particular the I/O buffer of a respective storage controller—and assigning, based on the information included in the table, a device group ID, in particular a so-called SAS-Phy-Group/Logical-Unit-Number (LUN)—to each of the analyzed data blocks. This may be performed before the respective blocks may be transferred from the I/O buffer memory to the storage device using the assignments.

According to one additionally preferred embodiment of the method, the assigning the device group ID is based on at least one selected out of the group including the device type, a SAS target device, a negotiated link rate and a SAS target negotiated hardware maximum link rate. Hence, performance parameters play a significant role in the assignment process in order to address devices with comparable performance values together.

According to an additionally advantageous embodiment, the method may also include monitoring the I/O performance of each of the device groups—i.e., of each device—and re-assigning one of the storage devices of one storage device group to another device group, in particular to another device group having another device group ID. Thus, devices may be moved between differently performing device groups dynamically without a requirement for a reconfiguration of the heterogeneous storage system. The system reconfigures itself always in a way to allow for an optimized performance even if devices may be exchanged, in particular being replaced, by higher performing devices (e.g., a hard drive may be replaced by an SSD device).

According to a further advantageous embodiment of the method, the re-assignment may include determining whether a storage device group performance of a mixed type device group—in particular HDD (hard drive device) and SSD (solid-state device)—may be above a threshold percentage—e.g., 80%—of an SSD device type performance and I/O requests to devices classified as HDD in the mixed type device group may be below a HDD threshold value, e.g., <50%. This would mean that a typical I/O performance of such a mixed storage device group is clearly above a calculated mixed I/O performance value because accesses to the SSDs are more often than to the HDDs. In such a case, a re-assignment of the storage device group from being classified as HDD class type to an SSD class type may be performed.

According to an additionally advantageous embodiment of the method, the re-assigning may include determining whether a storage device group performance of a mixed type device group—in particular HDD and SSD—may be below the threshold percentage—in particular, e.g., 80%—of an SSD device type performance and the I/O performance to devices classified as HDD in the mixed type device group is above a HDD threshold value, e.g., >50%. In such a case, a re-assignment of a storage device group from being classified as SSD class type to an HDD class type may be performed.

According to an optional embodiment of the method, the re-assigning may also include determining whether a trend over a predefined number of monitoring cycles of the storage device group performance of the storage device group may increase. Thus, not only point in time measurements may be used for re-assignments of storage device groups to storage classes, but also trends developing over a predefined period of time. This may give the proposed method and the related system high flexibility in adapting to new storage device types as part of the heterogeneous storage environment. This may protect made investments in heterogeneous storage systems allowing storage devices of different storage classes.

Consequently, and according to a further embodiment, the method may also include monitoring individual storage device performance values over time, and re-assigning a storage device to another storage device group using the individual storage device performance values over time.

In the following, a detailed description of the figures will be given. All instructions in the figures are schematic. Firstly, a block diagram of an embodiment of the inventive method for improving I/O performance in a heterogeneous storage environment is given. Afterwards, further embodiments, as well as embodiments of the system for improving I/O performance in a heterogeneous storage environment, will be described.

FIG. 1 shows a flow chart of an embodiment of the method 100 for improving I/O performance in a heterogeneous storage environment. The heterogeneous storage environment includes storage devices of different storage device types having different I/O performances. Each of the storage devices is accessible via a SAS interface. The method 100 includes identifying (step 102) a plurality of storage devices of the heterogeneous storage environment. This may be performed by an inquiry command via the SAS controller using a SAS discover request command and receiving, e.g., a 62 byte response. This response may identify the device class by a plurality of attribute values.

Additionally, the method 100 includes creating (step 104) a table—in particular a SAS-Phy-Group Target or LUN table—including information about identifiable storage devices, their storage device type and their assigned physical lane, i.e., the target port. Generally, storage devices of the storage system may be identified.

Furthermore, the method 100 includes separating (step 106) a block I/O data stream—which may be buffered in the I/O buffer of the storage controller before writing the data to the storage device—into storage device type classes, and routing (step 108) I/O requests of corresponding device type classes to their assigned physical lanes using the information included in the table. This way, the overall I/O performance of the heterogeneous storage environment can be increased significantly.

FIG. 2 shows a block diagram of an embodiment of a storage rack 200 on the left side of the figure. Symmetrically, on the right side of the figure, a second storage rack 200a is shown. Typically, the cabinets, in which the storage controller 202 and enclosure cabinets 204, . . . , 214 are mounted, are 19" racks or similar. Also shown are examples of the connection cables 216 from a socket of one storage device enclosure cabinet 212—here, to another socket 218—here, storage device enclosure cabinet 214. These cables are only shown for the upper half of the figure of the storage rack shown in solid lines. A skilled person will understand that the other connections are done in a respective manner. Only the input and output sockets 218 for the daisy chain connections from enclosure cabinet to enclosure cabinet carry reference numerals.

The physical connections from the controller to enclosure cabinets are done via a so-called wide port which provides for high-speed serial connections. Each storage enclosure can receive data I/O via two lanes for physical SAS lanes. Other cable material and the respective sockets in the enclosure cabinets are also available.

FIG. 3 shows a block diagram of an embodiment of a storage controller 300. The storage controller 300 includes a left storage controller component 302 and a right storage controller component 304. The internal elements of the left and right storage controller component are practically identical. Therefore, only the internal elements of the left storage controller component 302 will be described: a SAS I/O CPU is connected to a CPU memory 308, a DMA controller 310 and a host I/O cache 312. A connection to a server computer is typically done via fiber channel (FC) connections. For this purpose, the FC host adapter 314 is connected to the FC host port 316 and a $2^{nd}$ FC host port 318. The connection to the storage devices in the enclosure cabinets is done via the $1^{st}$ SAS port 320 and the $2^{nd}$ SAS port 322. For this, ports are connected to the SAS I/O CPU 306 via the $1^{st}$ SAS I/O core 324 and the $2^{nd}$ SAS I/O core 326. Another SAS I/O core 328 is used for a connection to a corresponding SAS I/O core 328 of the right storage controller component 304.

FIG. 4 shows a block diagram of an embodiment of a storage enclosure cabinet 402. The storage enclosure cabinet 402 includes a $1^{st}$ SAS expander 404 and a $2^{nd}$ SAS expander 406. Each of the SAS expanders includes a local controller to access the physical storage devices 408 to 410. Typically, up to 24 storage devices may be installed per enclosure cabinet. As can be seen, two SAS lanes to the storage device may be installed, from the $1^{st}$ SAS expander 404 to the respective storage device as well as from the $2^{nd}$ SAS expander 406. Typical enclosure cabinets 402 may house, e.g., 24 physical storage devices 408, 410.

FIG. 5 shows an exemplary layout of the table 500 including the assigned physical lane (LUN) logical unit number, an ID of the storage device (UID) and their storage device type (Type). Additional other attributes of each device may also be included as additional column into the table, as discussed above.

In the following, a more comprehensive explanation is given in order to understand the full value of the proposed solution: firstly, it may be noted that the physical layout of existing storage controllers may be used for the proposed approach. In an alternative solution, additional SAS lanes may have been installed in order to be able to separate the I/O communication by different speeds of the different storage device classes. A special SAS I/O optimizer module may have also been implemented which may include a SAS network switch capability to manage SAS ports for storage device groups/zones, to separate different latency data streams.

An additional software module may be required to match the communication streams.

The proposed solution may be implemented using software only. However, specific components, modules and/or units of the proposed solution may be implemented in hardware. This may have performance advantages and may address security issues as well.

Firstly, a typical scenario is provided describing how heterogeneous storage environments may develop over time: at a time T0, customers start with a storage system including only HDDs. However, physical storage devices of different vendors may be used; thus, already at this point in time, the storage system may be described as heterogeneous.

At another point in time T1, additional capacity is needed and additional HDDs are added. This increases the total storage capacity. At again another point in time T2, new storage technology becomes commercially available, e.g., SSDs. At a point in time T3, the user of the heterogeneous storage environment requires additional storage capacity and adds storage devices using the new storage technology, in particular SSDs. At a time T4, available storage systems may be reconstructed because of the shift to the higher percentage of the new storage technology. Alternatively, the available storage systems may be consolidated to fewer storage systems because capacities of individual storage devices may have increased over time. However also old HDDs may be reused in the consolidated systems.

At again another point in time T5, again newer storage technology may have become available, e.g., even faster SSDs or those with higher capacity have become available. In any case, today typical storage environments are operated 24 hours/7 days a week without interruption and the capacity growth of the storage systems should be implemented without any downtime. Therefore, typically additional storage enclosure cabinets—or expansion units—are simply added to the storage systems. The users do not want to power down the storage system and physically reconfigure the storage devices already installed in the expansion units.

Now, a sequence of operational steps of the proposed method and the related system will be described:

Step 1. A device type SAS-Phy-Group-target/LUN table is created and specific devices are added to the table (see above). The table of attached storage devices is formed using a command like SAS discover, SAS inquiry and SAS response from a SAS enclosure service (SES). The table may be created in the SAS controller flash memory of the SAS controller that controls the SAS initiator ports (compare 320, 322) to the attached target storage device. Over and above the attributes shown in the table according to FIG.

5, many more attribute values may be collected during this process like those already mentioned above: enclosure#, slot#, vendor name, device type, SAS initiator port type, SAS initiator port ID, SAS initiator physical lane ID, SAS Enclosure Target Port ID, SAS Enclosure Target Physical Lane ID, SAS target expander port ID, SAS target expander lane ID, SAS target device port ID, SAS target device lane ID, SAS target device negotiated link rate, SAS target device hardware minimum link rate, SAS target device hardware maximum link rate, SAS target negotiated hardware maximum link rate deviation. Generally, the table may be expanded for usage of other additional attributes.

Step 2. A software module that analyses the data blocks stored from the host into the storage systems I/O-buffer memory may be used. The software module is cyclically releasing one or more parallel process-threads seeking through the I/O-buffer memory and analyzing each data block to which target/LUN ID it should be stored to and flags the block to a SAS-Phy-Group. One or more SAS-Phy-Groups may be assigned. The SAS-Phy-Group assignment may be done based on the information provided in the table described in the context of FIG. 5 under the first step.

Step 3. The function to read the SAS-Phy-Group-Flag of the data-block in the I/O buffer memory of the storage controller is implemented. In the here described example, only 2 SAS-Phy-Groups are explained.

Step 4. If a data block is flagged to be transferred to a target and LUN held by a SSD storage device, the data blocks are transferred from the storage system I/O-buffer memory via SAS-Phy-Group assigned to SSD device.

Step 5. If the data-block is flagged to be transferred to a target and LUN hold by a HDD storage device, the data blocks are transferred from the storage system I/O-buffer memory via the SAS-Phy-Group assigned to HDD device.

Step 6. Another software module is added to monitor the SAS-I/O performance on each device type as highest possible level. With the I/O-Performance of the different device types used in a storage system monitored, the software module dynamically changes the SAS-Phy-Group assignment in the table.

Step 6a. As an example: In the storage system, one may have 2 SAS ports each operating 4 physical SAS-Lanes. The invented software module is reading I/O history learning table, described in step 7 below, at initial start. If the I/O historical learning table is empty, like in case of a first time initial start of the storage system, the disk type SSD has 50% of the Physical SAS lanes assigned in SAS-Port A and 50% of the Physical SAS lanes assigned in SAS-Port B. The other 50% of the SAS lanes are then assigned to SAS-Phy-Group for disk type HDD.

Step 6b. Now, if the added software SAS lane monitor is reaching the threshold of higher than, e.g., 80% on the I/O in SAS-Phy-Group to the Disk Type SSD, with trend increasing, AND the threshold for I/O in SAS-Phy-Group to the Disk-Type HDD is lower than, e.g., 50%, the software module removes a physical SAS lane from the SAS-Phy-Group of Disk-Type HDD and assigns it to the SAS-Phy-Group for Disk-Type SSD.

Step 6c. In the opposite way, if the added software SAS lane monitor is reaching the threshold of higher than 80% on the I/O in SAS-Phy-Group to the Disk Type HDD, with trend increasing, AND the threshold for I/O in SAS-Phy-Group to the Disk-Type SSD is lower than 50%, the software module removes a physical SAS Lane from the SAS-Phy-Group of Disk-Type SSD and assigns it to the SAS-Phy-Group for Disk-Type HDD.

Step 6d. In the case of the added software SAS lane monitor is determining a threshold of higher than 80% on the I/O in both SAS-Phy-Groups to both used Disk-Types, HDD AND SSD, then no changes can be made in the first step. In this case, the I/O transport will be managed based on the amount of I/O-buffer memory used by the data flagged for each SAS-Phy-Group. Then, the monitor will thread another program to inform the added software module analyzing the data blocks stored from the host into the storage systems I/O-buffer memory to throttle (i.e., delay) the I/O performance as possible and initiate an alert of "physical SAS Bandwith limits are reached" to the operator.

Step 7. Another function of the SAS-I/O performance software monitor, described in step 6 before, is the historical recording of the time when a host is operating I/O to/from a storage type into a database table, I/O historical learning. The function is recording the time stamp, the number of blocks transferred, the target/LUN and device type to which the I/O was performed and the time stamp of when the I/O operation finished. Based on this data the function analyzes the I/O pattern and timing and provides the necessary amount of SAS lanes required for each disk type and SAS-Phy-Group of lanes into a planning table. The planning table is accessed by the added SAS-I/O performance software monitor frequently during operation and after a boot of the storage system to provide the initial optimal physical SAS lane assignment into the SAS lane groups for the different used device types, as described in Step 6a.

FIG. 6 shows an embodiment of the system 600 for improving I/O performance in a heterogeneous storage environment in a more condensed way. In the system 600, the heterogeneous storage environment includes storage devices of different storage device types having different I/O performances. Each of the storage devices is accessible via a SAS interface. The system includes an identification unit 602 adapted for identifying a plurality of storage devices of the heterogeneous storage environment and a creation module 604 adapted for creating a table including information about identifiable storage devices, their storage device type and their assigned physical lane.

Furthermore, the system 600 includes a separation unit 606 adapted for separating a block I/O data stream into storage device type classes, and a routing controller 608 adapted for routing I/O requests of corresponding device type classes to their assigned physical lanes using the information included in the table, thereby improving the I/O performance of the heterogeneous storage environment.

Embodiments of the invention may be implemented together with virtually any type of computer, regardless of the platform being suitable for storing and/or executing program code.

FIG. 7 shows, as an example, a computing system 700 suitable for executing program code related to the proposed method. The storage controller (compare FIG. 3 and the related explanations) may be seen as a computing system 700 itself because it may include all necessary components.

The computing system 700 is only one example of a suitable computer system and is not intended to suggest any limitation as to the scope of use or functionality of embodiments of the invention described herein. Regardless, computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 700 is shown in the form of a general-purpose computing device. The components of computer system/server 700 may include, but are not limited to, one or more processors or processing units 702, a system memory 704, and a bus 706 that links with various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limitation, as well as an operating system, one or more application programs, other program modules, and program data. Each of the operating system, one or more application programs, other program modules, and program data or some combination thereof, may include an implementation of a networking environment. Program modules 716 generally carry out the functions and/or methodologies of embodiments of the invention as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of computer system/server 700 via bus 706. It should be understood that although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, the system 600 for improving I/O performance in a heterogeneous storage environment may be attached to the bus system 706.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A method for improving I/O performance in a heterogeneous storage environment, wherein the heterogeneous storage environment comprises storage devices of different storage device types having different I/O performances, and wherein each of the storage devices is accessible via a SAS interface, the method comprising:
   identifying a plurality of storage devices of the heterogeneous storage environment;
   creating a table comprising information about identifiable storage devices, their storage device type and their assigned physical lane;
   separating a block I/O data stream, stored in an I/O buffer memory, according to storage device type; and
   routing I/O requests of corresponding storage device type to their assigned physical lanes using the information comprised in the table, thereby improving the I/O performance of the heterogeneous storage environment.

2. The method of claim 1, wherein each of the storage device types is selected from the group consisting of a magnetic hard drive, a solid state disk, a flash memory, a memristor storage, a magneto-resistive RAM, and a race track memory.

3. The method of claim 1, wherein the table comprises additionally at least one attribute for each of the identified storage devices selected from the group consisting of enclosure ID, slot ID, vendor name, SAS initiator port Type, SAS initiator port ID, SAS initiator physical lane ID, SAS enclosure target port ID, SAS enclosure target physical lane ID, SAS target expander port ID, SAS target expander lane ID, SAS target device port ID, SAS target device lane ID, SAS target device negotiated link rate, SAS target device hardware minimum link rate, SAS target device hardware maximum link rate, SAS target negotiated hardware maximum link rate deviation, and a device type.

4. The method of claim 1, further comprising:
   analyzing data blocks stored in the I/O buffer memory; and
   assigning, based on the information comprised in the table, a device group ID to each of the analyzed data blocks.

5. The method of claim 4, wherein assigning the device group ID is based on at least one selected from the group consisting of the storage device type, a SAS target device, a negotiated link rate, and a SAS target negotiated hardware maximum link rate.

6. The method of claim 1, further comprising:
   monitoring the I/O performance of each of the storage devices; and
   re-assigning one of the storage devices of one storage device group to another storage device group.

7. The method of claim 6, wherein the re-assigning comprises determining whether a storage device group performance of a mixed type device group is above a threshold percentage of an SSD device type performance and I/O requests to devices classified as HDD in the mixed type device group is below a HDD threshold value.

8. The method of claim 6, wherein the re-assigning comprises determining whether a storage device group performance of a mixed type device group is below the threshold percentage of an SSD device type performance and I/O requests to devices classified as HDD in the mixed type device group is above a HDD threshold value.

9. The method of claim 6, wherein the re-assigning comprises determining whether a trend over a predefined number of monitoring cycles of the storage device group performance of the storage device group increases.

10. The method of claim 1, further comprising:
    monitoring individual storage device performance values over time; and
    re-assigning a storage device to another storage device group using the individual storage device performance values over time.

11. A computer system for improving I/O performance in a heterogeneous storage environment, wherein the heterogeneous storage environment comprises storage devices of different storage device types having different I/O performances, and wherein each of the storage devices is accessible via a SAS interface, the computer system comprising:
    one or more processors, one or more computer-readable memories, one or more computer-readable tangible storage devices, and program instructions stored on at least one of the one or more storage devices for execution by at least of the one or more processors via at least one of the one or more memories, the program instructions comprising;
    program instructions to identify a plurality of storage devices of the heterogeneous storage environment;
    program instructions to create a table comprising information about identifiable storage devices, their storage device type and their assigned physical lane;
    program instructions to separate a block I/O data stream, stored in an I/O buffer memory, according to storage device type; and
    program instructions to route I/O requests of corresponding storage device type to their assigned physical lanes using the information comprised in the table, thereby improving the I/O performance of the heterogeneous storage environment.

12. The computer system of claim 11, wherein each of the storage device types is selected from the group consisting of a magnetic hard drive, a solid state disk, a flash memory, a memristor storage, a magneto-resistive RAM, and a race track memory.

13. The computer system of claim 11, wherein the table comprises additionally at least one attribute for each of the identified storage devices selected from the group consisting of enclosure ID, slot ID, vendor name, SAS initiator port Type, SAS initiator port ID, SAS initiator physical lane ID, SAS enclosure target port ID, SAS enclosure target physical lane ID, SAS target expander port ID, SAS target expander lane ID, SAS target device port ID, SAS target device lane ID, SAS target device negotiated link rate, SAS target device hardware minimum link rate, SAS target device hardware maximum link rate, SAS target negotiated hardware maximum link rate deviation, and a device type.

14. The computer system of claim 11, further comprising:
program instructions to analyze data blocks stored in the I/O buffer memory; and
program instructions to assign, based on the information comprised in the table, a device group ID to each of the analyzed data blocks.

15. The computer system of claim 14, wherein assigning the device group ID is based on at least one selected from the group consisting of the storage device type, a SAS target device, a negotiated link rate, and a SAS target negotiated hardware maximum link rate.

16. The computer system of claim 11, further comprising:
program instructions to monitor the I/O performance of each of the storage devices; and
program instructions to re-assign one of the storage devices of one storage device group to another storage device group.

17. The computer system of claim 16, wherein the re-assign comprises program instructions to determine whether a storage device group performance of a mixed type device group is above a threshold percentage of an SSD device type performance and I/O requests to devices classified as HDD in the mixed type device group is below a HDD threshold value.

18. The computer system of claim 16, wherein the re-assign comprises program instructions to determine whether a storage device group performance of a mixed type device group is below the threshold percentage of an SSD device type performance and I/O requests to devices classified as HDD in the mixed type device group is above a HDD threshold value.

19. The computer system of claim 11, further comprising:
program instructions to monitor individual storage device performance values over time, and
program instructions to re-assign a storage device to another storage device group using the individual storage device performance values over time.

20. A computer program product for improving I/O performance in a heterogeneous storage environment wherein the heterogeneous storage environment comprises storage devices of different storage device types having different I/O performances, and wherein each of the storage devices is accessible via a SAS interface, the computer program product comprising:
one or more computer-readable storage devices and program instructions stored on at least one of the one or more tangible storage devices, the program instructions comprising:
program instructions to identify a plurality of storage devices of the heterogeneous storage environment;
program instructions to create a table comprising information about identifiable storage devices, their storage device type and their assigned physical lane;
program instructions to separate a block I/O data stream, stored in an I/O buffer memory, according to storage device type; and
program instructions to route I/O requests of corresponding storage device type to their assigned physical lanes using the information comprised in the table, thereby improving the I/O performance of the heterogeneous storage environment.

* * * * *